United States Patent [19]
Delonge et al.

[11] Patent Number: 5,472,314
[45] Date of Patent: Dec. 5, 1995

[54] VARIABLE CAMBER TURBOMACHINE BLADE HAVING RESILIENT ARTICULATION

[75] Inventors: Jean-Claude L. Delonge, Corbeil Essonnes; Claude J. A. Loudet, Maincy; Gérard R. E. R. Vermont, Coubert, all of France

[73] Assignee: Societe Nationale d'Etude et de Construction de Moteurs d'Aviation "Snecma", Paris, France

[21] Appl. No.: 271,634

[22] Filed: Jul. 7, 1994

[30] Foreign Application Priority Data

Jul. 7, 1993 [FR] France ................... 93 08316

[51] Int. Cl.$^6$ .............................. F01D 9/02; F04D 29/56
[52] U.S. Cl. .................... 415/156; 415/160; 415/115
[58] Field of Search ..................... 415/156, 160, 415/161, 115, 116

[56] References Cited

U.S. PATENT DOCUMENTS

| | | | |
|---|---|---|---|
| 3,237,918 | 3/1966 | Le Bell et al. | 415/156 |
| 4,705,452 | 11/1987 | Karadimas | 415/115 |
| 4,741,665 | 5/1988 | Hanser | 415/161 |
| 4,897,020 | 1/1990 | Tonks | 415/161 |
| 5,314,301 | 5/1994 | Knight | 415/161 |

FOREIGN PATENT DOCUMENTS

| | | |
|---|---|---|
| 2599785 | 12/1987 | France . |
| 1041739 | 6/1955 | Germany . |
| 61-250302 | 11/1986 | Japan .................... 415/115 X |

OTHER PUBLICATIONS

Patent Abstract of Japan, vol. 7, No. 193 (M-238) Aug. 24, 1983 & JP-A-58 093 903, Jun. 3, 1983, Yuutarou Matsuura, "Variable Inlet Guide Vane".

Primary Examiner—Edward K. Look
Assistant Examiner—Michael S. Lee
Attorney, Agent, or Firm—Oblon, Spivak, McClelland, Maier & Neustadt

[57] ABSTRACT

A variable camber vane for a turbomachine comprises leading and trailing edge parts, at least one of which is pivotable relative to the other, and a resilient joining part inserted into a space provided between the leading and trailing edge parts, the joining part being formed by a block of resilient material which is bonded to the leading and trailing edge parts and which ensures the continuity of the intrados and extrados faces of the vane to permit an even flow of fluid along the vane. The vane may also include means for enabling a cooling or heating fluid to flow in the leading and trailing edge parts, and a plurality of ducts in the resilient joining part establishing communication between the fluid flow means of the leading and trailing edge parts.

5 Claims, 2 Drawing Sheets

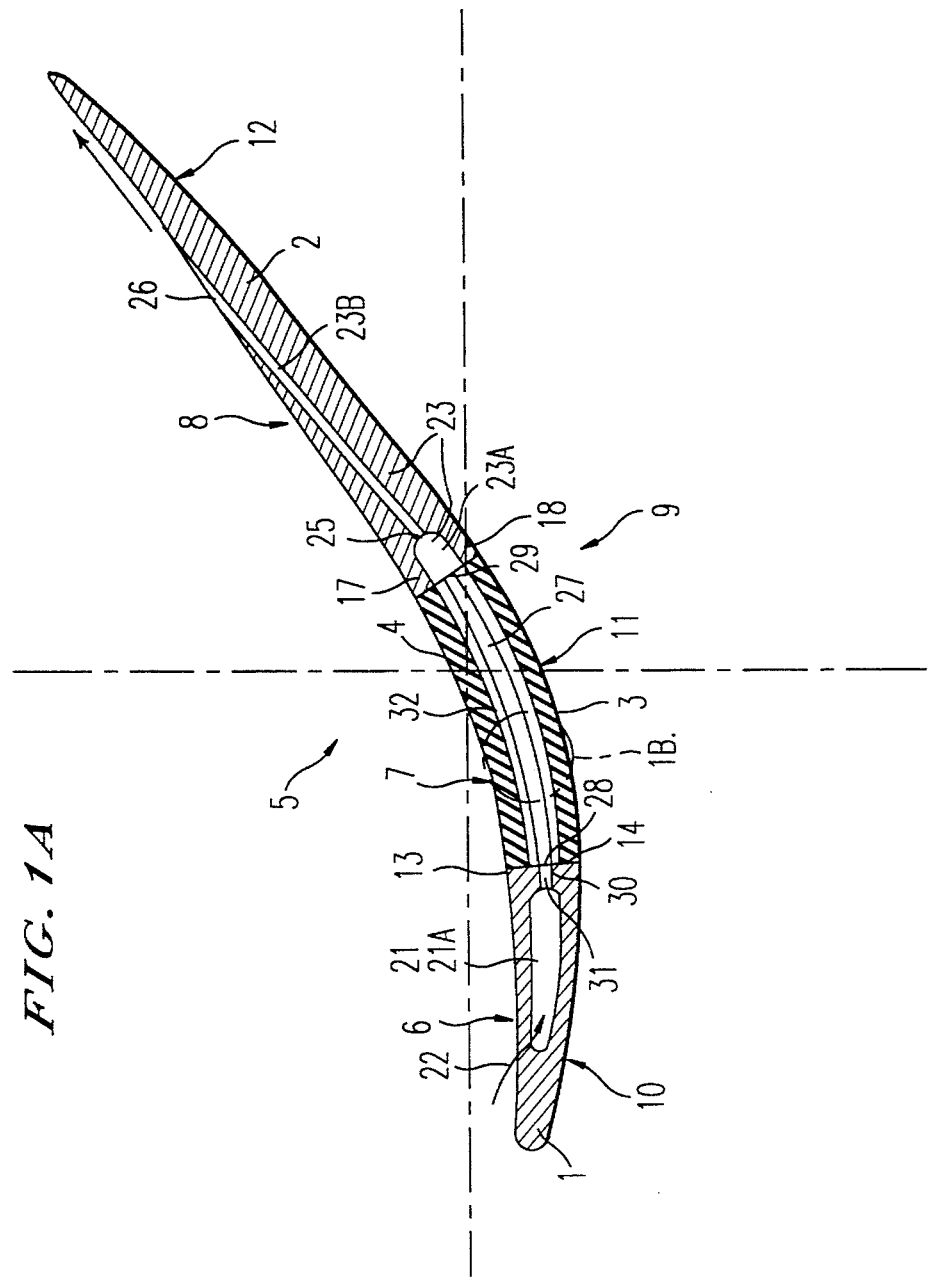
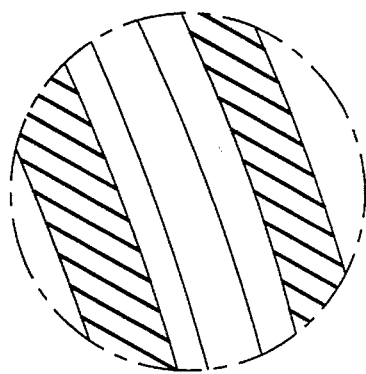
FIG. 1A
FIG. 1B

VARIABLE CAMBER TURBOMACHINE BLADE HAVING RESILIENT ARTICULATION

BACKGROUND OF THE INVENTION

1. Field of the Invention

The invention relates to variable camber vanes used in turbomachines, particularly turbine engines for aircraft.

In order to improve the performance of a turbomachine likely to operate at different speeds, it is current practice to modify the inclination of certain vanes depending on the speed of the turbomachine. In a more elaborate arrangement it is also possible to vary the camber of some vanes depending on the speed of the turbomachine. Such variable camber vanes generally have a forward part termed the leading edge part, and a rear part termed the trailing edge part, which are pivotable relative to each other.

2. Summary of the Prior Art

Variable camber vanes are known having a fixed leading edge part and a movable trailing edge part, one example being disclosed in EP specification 0 274 293 in the form an air intake guide vane in which the leading edge part also forms a radial arm providing a connection between the air intake casing and the hub of an aircraft turbine engine.

Also known are variable camber vanes in which the leading edge part pivots and the trailing edge part remains stationary, for example as described in FR patent 2 325 831.

In addition, variable camber vanes are known in which the leading edge and trailing edge parts both pivot, as disclosed in U.S. Pat. No. 4,995,786.

In all of these types of vanes the improvement in performance obtained by adjusting the camber of the vane in the best possible way is adversely affected by the disturbances which manifest themselves in the fluid flowing along the side faces of the vane and at the level of the articulation. These disturbances originate from the spacing left between the leading edge part and the trailing edge part at the position of the articulation between them, and also from the discontinuity of the side surfaces of the vane at the position of the articulation, that is to say from the sudden change of direction of the tangent to these surfaces in the direction of fluid flow.

To overcome this drawback, EP specification 0 223 194 proposes placing a membrane of elastomeric or other material on each face of the blade, in the vicinity of the articulation. This solution prevents air from entering the space between the leading edge part and the trailing edge part, but a break in the continuity of the lateral surfaces of the vane in the vicinity of the articulation still remains.

In order to cool a vane, or alternatively to heat it, for example to remove ice which may possibly form on its surface, it is known to circulate a cooling or heating fluid inside the vane. However, this operation is complicated by the presence of the articulation between the leading edge part and the trailing edge part.

It is possible to inject the fluid separately into the leading edge and trailing edge parts. Injection into the fixed part of the vane poses no particular problem, but injection into the movable part of the vane requires a second circuit to pass, for example, through the pivots on which the movable part of the vane swivels in the casing. An example of such an arrangement is disclosed in FR patent 2 599 785.

The fluid may also be injected at a suitable place on the vane and made to circulate inside the vane from the fixed part to the movable part, or vice versa, but in this case fluid losses must be accepted because of the lack of fluid-tightness at the articulation position.

Accordingly, this solution is not suitable when it is necessary to de-ice air intake vanes of turbomachines such as those described in the aforementioned EP specification 0 274 293, since the hot de-icing air has to be taken from the compressor and leaks at the articulation position make an additional drawing necessary, which impairs the operation of the compressor.

The terminology currently used to denote each of the flanks of a vane should be noted. The flank which exerts a thrust on the fluid to be processed or which receives a thrust from it is generally concave and is denoted by the term intrados face. The flank opposite the intrados face is generally convex and is denoted by the term extrados face.

SUMMARY OF THE INVENTION

It is an object of the invention to provide a variable camber vane for a turbomachine which will allow an even flow of fluid along the flanks of the vane.

To this end, the invention provides a variable camber vane having an intrados face and an extrados face and comprising a leading edge part, a trailing edge part disposed relative to said leading edge part to define a space therebetween, means for mounting at least one of said edge parts for pivotal movement relative to the other of said edge parts about an axis of rotation in the direction of the height of said vane, and a resilient joining part within said space between said leading edge part and said trailing edge part, said joining part comprising a block of resilient material firmly secured on one side to said leading edge part and on its opposite side to said trailing edge part, said block of resilient material, said leading edge part and said trailing edge part each having first and second flanks, said first flank of said block forming a continuation of said first flanks of said leading and trailing edge parts and defining therewith said intrados face of said vane, and said second flank of said block forming a continuation of said second flanks of said leading and trailing edge parts and defining therewith said extrados face of said vane.

The resilient joining part preferably fills the space between the leading edge part and the trailing edge part, and is firmly connected to these parts by glueing.

The leading edge part and the trailing edge part may each have internal means for the flow of a fluid, and the resilient joining part may have a plurality of ducts passing through it to establish communication between the said internal fluid flow means of the leading and trailing edge parts. This arrangement permits the flow of a cooling fluid or a heating fluid inside the vane.

In a preferred embodiment, the fluid flow means in the leading edge part of the vane is an elongated cavity extending over all or part of the height of the leading edge part. This cavity may, however, weaken the leading edge part if it is contiguous with the resilient joining part. Preferably, therefore, the leading edge part is reinforced by a partition connecting the walls forming the intrados flank and the extrados flank of the leading edge part, this partition being mounted between the cavity and the resilient joining part.

The partition has through holes facing the ducts passing through the resilient joining part in order to permit the flow of fluid between the leading edge part and the resilient joining part.

Because the trailing edge part is generally thinner and more elongated than the leading edge part, the fluid flow means in the trailing edge part preferably comprises a cavity acting as a collector into which open the ducts passing through the resilient joining part, and a plurality of ducts which lead from the collector and open out onto the intrados flank of the trailing edge part.

In the preferred embodiment, the leading edge part is fixed, the trailing edge part pivots, and the cooling or heating fluid is injected into the fluid flow means of the leading edge part. With this arrangement, the injected fluid passes into the fluid flow cavity of the leading edge part, flows through the multiple ducts of the resilient joining part, and is mixed in the collector before being divided into the ducts of the trailing edge part and finally leaving the vane on the intrados face near the end of the trailing edge part. The cooling or heating fluid thus exerts a uniform thermal action on the leading edge part, on the resilient joining part and on the trailing edge part of the vane.

The glueing effected between the resilient joining part and the leading and trailing edge parts respectively ensures perfect continuity of the lateral surfaces of the leading edge part, the resilient joining part and the trailing edge part, and also ensures a good seal between the resilient joining part and the fluid flow means of the leading edge part and of the trailing edge part.

An advantage of the invention is to enable the efficiency of the vane heating or cooling process to be improved by the injection of a fluid into cavities of the vane provided for this purpose, as the flow of this fluid between the leading edge part and the trailing edge part takes place in a sealed circuit as a result of the presence of the resilient joining part connecting the leading edge and the trailing edge parts.

For example, in the case of an air intake guide vane, the hot air used for de-icing this vane can be cut from 400° C. down to 200° C. This hot air, which is usually taken from the high pressure zones of the compressor can then be taken from zones at lower pressure, which affects the operation of the compressor much less.

The vane in accordance with the invention is also less sensitive to icing, which makes it suitable for use in those situations where the problem arises, for example at the first stage of the turbomachine compressor when it is exposed to the weather.

Indeed, with conventional variable camber vanes, air flow disturbances in the articulation region tend to promote the generation and deposition of ice on the pivoted part of the vane. With the invention, however, disturbances in the air flow are neutralized and icing is consequently much reduced. This reduction in icing is further reinforced by the fact that the resilient joining part promotes the dislocation and detachment of the rigid coating of ice which tends to form on the surface of the vane.

A preferred embodiment of the invention as applied to an air intake guide vane in an aircarft turbine engine will now be described, by way of example, with reference to the attached drawings.

BRIEF DESCRIPTION OF THE DRAWINGS

FIG. 1 shows a cross-sectional view of the variable camber guide vane of the preferred embodiment, taken along a plane perpendicular to the height of the vane.

DESCRIPTION OF THE PREFERRED EMBODIMENT

Figure 2:
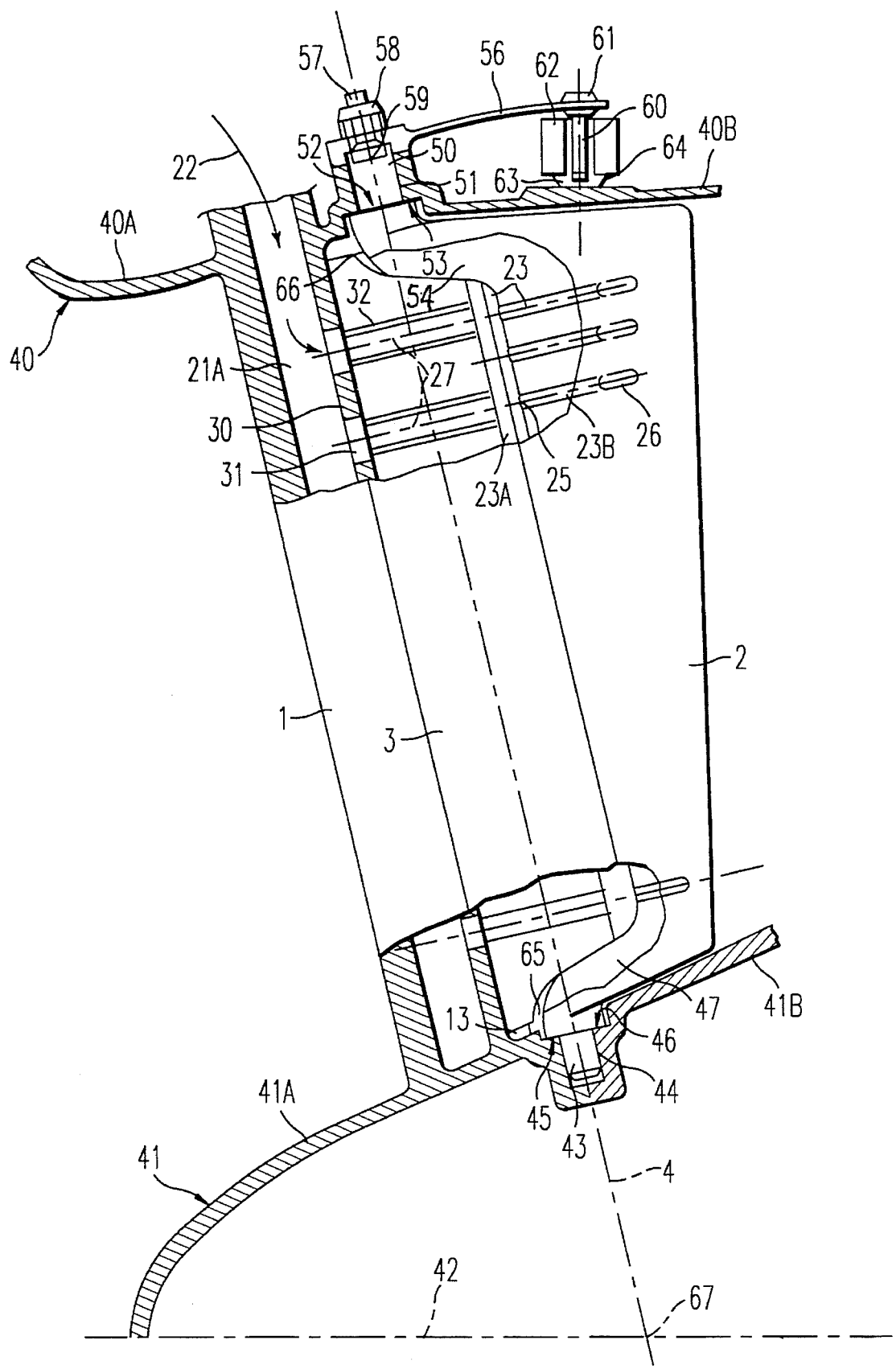
FIG. 2 shows a side view of the vane in a turbine engine, the upper and lower parts of the vane, as well as the mounting of the vane in the air intake casing of the engine, being shown in section.

The vane shown in the drawings comprises a forward or leading edge part 1, a rear or trailing edge part 2, and a unitary resilient joining part 3 firmly secured to the leading edge part 1 and to the trailing edge part 2. The leading and trailing edge parts 1 and 2 are pivoted relative to each other about a geometrical axis of rotation 4.

The vane has concave flank or intrados face 5 which is defined, from the front towards the rear of the vane, by a flank 6 of the leading edge part 1, a flank 7 of the resilient joining part 3 and a flank 8 of the trailing edge part 2, the said flank 7 of the resilient joining part 3 having an even curvature forming a smooth continuation of the flanks 6 and 8 of the leading and trailing edge parts 1 and 2 respectively so as to permit an even flow of fluid along the intrados face 5.

Similarly, the vane also has a convex flank or extrados face 9 which is defined, from the front towards the rear of the vane, by a flank 10 of the leading edge part 1, a flank 11 of the resilient joining part 3 and a flank 12 of the trailing edge part 2, the said flank 11 of the resilient joining part 3 having an even curvature forming a smooth continuation of the flanks 10 and 12 of the leading and trailing edge parts 1 and 2 respectively so as to permit an even flow of fluid along the extrados face 9.

The leading edge part 1 has two lips 13 and 14 entering two grooves in the resilient joining part 3, the said grooves having a shape exactly complementary to the lips 13 and 14 and forming with them a contact surface used for the glueing of the resilient joining part 3 to the leading edge part 1. Likewise, the trailing edge part 2 also has two lips 17 and 18 entering two further grooves in the resilient joining part 3, the said grooves having a shape exactly complementary to the lips 17 and 18 and forming with them a contact surface used for the glueing of the resilient joining part 3 to the trailing edge part 2.

This arrangement increases the glueing surface and consequently the strength of this glued bond. The arrangement also facilitates the relative positioning of the parts before and during the glueing of the resilient joining part 3 to the leading edge part 1 and the trailing edge part 2.

The lips 13, 14, 17 and 18 preferably extend throughout the height of the resilient joining part 3 in contact with the leading edge part 1 and the trailing edge part 2.

The vane has a ratio 1a/e=16 wherein

1a=the width of the vane, between the leading end of the leading edge part and the trailing end of the trailing edge part, and e=the thickness of the vane.

For a variation of the angle of inclination of the trailing edge part ranging from 0° to 66°, a ratio 1c/e=4 has been adopted, wherein 1c=the length of the space left between the leading edge part and the trailing edge part, and e=the thickness of the vane.

In order to prevent shearing stresses on the bonds, the width of the resilient joining part 3 is slightly increased so that the joining part is compressed between the leading edge part 1 and the trailing edge part 2. However, the compression must become nil or negative towards the large cambers of the vane so as not to bring about a shifting of the resilient joining part 3 on the extrados face 9.

The leading edge part 1 has means 21 permitting the internal flow of a de-icing fluid 22. In the preferred embodiment, this means 21 consists of a cavity 21A extending throughout the height of the leading edge part 1.

The trailing edge part 2 also has means 23 for the internal flow of the de-icing fluid, and in the preferred embodiment this means 23 comprises a cavity 23A adjacent the resilient joining part 3 to act as a collector, and a plurality of ducts 23B which open at one end 25 into the cavity 23A and open at the other end 26 onto the flank 8 forming the intrados face of the trailing edge part 2.

The resilient joining part 3 contains a plurality of ducts 27, one end 28 of which passes between the lips 13 and 14 and opens into the cavity 21 of the leading edge part 1, and the other end 29 of which passes between the lips 17 and 18 and opens into the collector cavity 23A of the trailing edge part 2. With this arrangement, the heating fluid 22 passes through the vane by proceeding along the cavity 21 of the leading edge part 1, through the ducts 27 of the resilient joining part 3, into the cavity 23A and through the ducts 23B of the trailing edge part 2 to come out onto the flank 8 of the trailing edge part 2 forming part of the intrados face 5 of the vane.

In order to increase its strength, the leading edge part 1 has a partition 30 which bounds the cavity 21A on the side of the resilient joining part 3, the partition 30 extending over the whole or part of the height of the cavity 21A. This partition 30 includes a plurality of apertures 31 facing the ducts 27 to enable the fluid 22 to flow from the cavity 21A into the said ducts 27.

The ducts 27 preferably include a sheath 32 comprising a helical spring with contiguous turns or a stack of rings, the sheaths 32 preventing crushing of the ducts 27.

The cavity 23A of the trailing edge part permits the collection of the fluid 22 passing through the ducts 27 of the resilient joining part 3 and makes it unnecessary to align the said ducts 27 with the ducts 23B of the trailing edge part 2.

With reference now to FIG. 2, the leading edge part 1 is rigidly connected at one end to the air intake casing 40 of the turbine engine, and at the other end to the hub 41. The air intake casing and the hub 41 have an annular shape around the axis 42 and are connected to each other by the leading edge parts 1 of all of the vanes.

The trailing edge part 2 swivels on two pivots about the axis of rotation 4. An inner pivot 43 is journalled in a bore 44 in the hub 41, and has a shoulder 45 facing a stop 46 on the hub 41 at the inlet of the bore 44, the said stop facing outwards and surrounding the bore 44. A bush, not represented in FIG. 2, will preferably be located in the hole 44 and bearing against the stop 46 to facilitate the rotation of the pivot 43 and prevent wear of the bore 44 and the stop 46 of the hub 41. The pivot 43 is connected to the trailing edge part 2 by an arm 47.

An outer pivot 50 is journalled in a bore 51 in the air intake casing 40, and has a shoulder 52 facing a stop 53 on the casing 40 at the inlet of the bore 51, the said stop facing inwards and surrounding the bore 51. As before, a bush (not shown) will preferably be located in the bore 51 and bearing against the stop 53. The pivot 50 is connected to the trailing edge part 2 by an outer arm 54.

The end of the pivot 50 projects through the bore 51 and has a control lever 56 rigidly connected to it by a screw 57 and a nut 58. The angular positioning of the lever 56 relative to the leading edge part 2 is ensured, for example, by a plate 59 at the end of the pivot 50 which is complementary to another plate (not shown) on the lever 56.

The control lever 56 has a radially extending finger 60 secured to its end opposite the pivot 50 by a crimped connection 61, and this finger 60 slides and pivots in a vane control ring 62 which is guided in rotation about the axis 42 by a plurality of shoes in contact with a circular surface 64 around the air intake casing 40.

The air intake casing 40 has a plurality of vanes identical to the vane just described, and it will be appreciated that an angular displacement of the control ring 62 about the axis 42 causes a uniform pivoting of the trailing edge part 2 of each vane around its pivot axis 4.

The cavity 21A of the leading edge part 1 is open at the air intake casing 40 end and closed at the hub 41 end. The heating fluid 22 is injected into the cavity 21A through its open end, flows through the apertures 31 of the reinforcing partition 30, passes through the resilient joining part 3 via the ducts 27, is mixed in the cavity 23A of the trailing edge part 2, is distributed into each of the ducts 23B of the trailing edge part 2, and comes out onto the intrados face through the openings 26.

A clearance 65 is left between the resilient joining part 3 and the arm 47 supporting the inner pivot 43 of the trailing edge part 2, and a similar clearance 66 is left between the resilient joining part 3 and the arm 54 supporting the outer pivot 50 of the trailing edge part 2. These clearance 65 and 66 avoid parasitic frictions between the resilient joining part 3 and the arms 47 and 54 when the trailing edge part 2 pivots, which would otherwise cause undesirable deformations of the resilient joining part 3.

The clearances 65 and 66 gradually decrease and reach a zero or negative value in the vicinity of the cavity 23A of the trailing edge part 2 so as to ensure the sealing of this cavity 23A and thus prevent unnecessary loss of the heating fluid 22.

In order to be able to assemble the pivoting trailing edge part 2, the air intake casing 40 and the hub 41 are composed of two parts, 40A–40B and 41A–41B respectively, separated on the surface of a cone of revolution which is coaxial with the axis 42 of the hub 41 and the apex 67 of which is at the intersection of the vane pivot axis 4 and the axis 42. The surface of the cone of revolution passes through the pivot axis of each of the vanes, and thus the bores 44 and 51 in which the pivots 50 and 43 of the trailing edge parts 2 pivot open into two parts.

Assembly is then effected as follows:

1) Glueing the resilient joining parts 3 to the trailing edge parts 2;

2) Glueing the connected joining parts and trailing edge parts to the leading edge parts 1, after having arranged the pivots 43 and 50 in the open holes 44 and 51;

3) Assembly and bolting of the part 40B of the air intake casing 40 to the part 40A; and 4) Assembly and bolting of the part 41B of the hub 41 to the part 41A.

The adhesives and the glueing techniques used are well known to the specialist. In the present case, the cold bonding agent RTV 732, a Rhône-Poulenc trade mark, is used.

The resilient joining part 3 is moulded, the sheaths 32 of the ducts 27 in the joining part 3 being placed in the mould before the elastomer is injected. The elastomer used is preferably a silicone based elastomer capable of withstanding a maximum temperature of 315° C., compared with the operating temperature in use of about 200° C., and may be, for example, RP 60 THT (a Rhône-Poulenc trade mark).

If the resilient joining part 3 has a uniform section, and does not have any ducts 27, it will be possible to cut the part from length of suitably profiled section.

It will be understood that the air intake guide vane which has just been described is only a non limitative embodiment of the invention.

For example, the vane may have a movable leading edge part 1 and a pivoting trailing edge part 2, or a leading edge part 1 and a trailing edge part 2 which both pivot.

The invention also encompasses numerous variations in the means 21 and 22 for the flow of fluid in the leading edge part 1 and the trailing edge part 2, such as, for example, a sealed circuit permitting the recovery for further use of the cooling or heating fluid which passed through the vane. In the complex case, for example, of a vane with pivoting leading edge and trailing edge parts, the fluid may be injected into the leading edge part through one of its pivots, flow into the leading edge part, pass through the resilient joining part, flow into the trailing edge part, and come out through a pivot of the trailing edge part to be recovered for further use, such as, for example, the de-icing of the forward part of the hub 41.

As mentioned earlier, the elastomer used is preferably a silicone-based elastomer. However, according to temperature or environmental conditions, fluorinated or fluorosilicone elastomers may also be used. The elastomer used preferably has a Shore hardness of between 40 and 70, according to the ISO 48-1979 (F) standard.

We claim:

1. A variable camber vane for a turbomachine, said vane having an intrados face and an extrados face and comprising leading edge part, trailing edge part disposed relative to said leading edge part to define a space therebetween, means for mounting at least one of said edge parts for pivotal movement relative to the other of said edge parts about an axis of rotation in the direction of the height of said vane, and a resilient joining part within said space between said leading edge part and said trailing edge part, said joining part comprising a block of resilient material firmly secured on one side to said leading edge part and on its opposite side to said trailing edge part, said block of resilient material, said leading edge part and said trailing edge part each having first and second flanks, said first flank of said block forming a continuation of said first flanks of said leading and trailing edge parts and defining therewith said intrados face of said vane, and said second flank of said block forming a continuation of said second flanks of said leading and trailing edge parts and defining therewith said extrados face of said vane, wherein said joining part fills said space between said leading edge part and said trailing edge part.

2. A variable camber vane according to claim 1, wherein said block of resilient material forming said resilient joining part is firmly secured to said leading edge part and said trailing edge part by glueing.

3. A variable camber vane according to claim 1, wherein said block of resilient material forming said joining part is an elastomer of ISO/Shore hardness between 40 and 70.

4. A variable camber vane according to claim 1, wherein said leading edge part has a cavity, said trailing edge part has a cavity, and said resilient joining part includes a plurality of ducts opening at one end into said cavity in said leading edge part and at their other end into said cavity in said trailing edge part.

5. A variable camber vane according to claim 4, wherein each of said ducts includes a sheath to prevent it from being crushed.

* * * * *